United States Patent [19]
Mattar

[11] Patent Number: 5,054,326
[45] Date of Patent: Oct. 8, 1991

[54] DENSITY COMPENSATOR FOR CORIOLIS-TYPE MASS FLOWMETERS

[75] Inventor: Wade M. Mattar, Wrentham, Mass.

[73] Assignee: The Foxboro Company, Foxboro, Mass.

[21] Appl. No.: 489,340

[22] Filed: Mar. 5, 1990

[51] Int. Cl.⁵ .............................. G01F 1/84
[52] U.S. Cl. .................................. 73/861.38
[58] Field of Search ............... 73/861.37, 861.38

[56] References Cited

U.S. PATENT DOCUMENTS

| | | | |
|---|---|---|---|
| 3,339,400 | 9/1967 | Banks | 73/32 |
| 4,170,128 | 10/1979 | Kratky et al. | 73/30 |
| 4,703,660 | 11/1987 | Brenneman | 73/861.38 |
| 4,811,606 | 3/1989 | Hasengawa et al. | 73/861.38 |
| 4,823,613 | 4/1989 | Cage et al. | 73/861.38 |
| 4,823,614 | 4/1989 | Dahlin | 73/861.38 |
| 4,911,020 | 3/1990 | Thompson | 73/861.38 |

Primary Examiner—Herbert Goldstein
Attorney, Agent, or Firm—Fish & Richardson

[57] ABSTRACT

A density insensitive mass flowmeter for measuring mass flow of fluid includes a continuous conduit loop with at least two resonant modes of oscillation of conduit and at least one dummy mass disposed on the conduit at a vibrational node of one of said resonant modes of oscillation. The dummy mass has a mass and position on the conduit such that the ratio of resonant frequencies of the resonant modes remains substantially constant for different densities of fluid flowing through the conduit.

26 Claims, 4 Drawing Sheets

DENSITY COMPENSATOR FOR CORIOLIS-TYPE MASS FLOWMETERS

BACKGROUND OF THE INVENTION

The present invention relates to density compensators for oscillating-conduit Coriolis-type mass flowmeters.

In response to the need to measure the quantity of material being delivered through pipelines, numerous types of flowmeters have evolved from a variety of design principles. One of the more widely used types of flowmeters is based on volumetric flow. Volumetric flowmeters are at best inaccurate in determining the quantity of material delivered, where the density of the material varies with temperature of feedstock, where the fluid being pumped through the pipeline is polyphase such as a slurry or where the fluid is non-Newtonian such as mayonnaise and other food products. In addition, the metered delivery of liquid components for chemical reactions, which are in effect mass reactions where proportions are critical, may be poorly served by volumetric flowmeters.

A mass flowmeter, on the other hand, is an instrument that provides a direct indication of the quantity of mass, as opposed to volume, of material being transferred through the pipeline. Measurement of mass in a moving stream requires applying a force to the stream and detecting and measuring some consequence of the resulting acceleration.

One class of mass measuring flowmeters is based on the well-known Coriolis effect. Examples of Coriolis-type mass flowmeters are described in U.S. Pat. No. 4,891,991 to Mattar et al., entitled "Coriolis-Type Mass Flowmeter," issued on Jan. 9, 1990, and U.S. patent application Ser. No. 07/446,310 filed Dec. 5, 1989 by Hussain et al., both assigned to the assignee of the present invention and incorporated herein by reference in their entirety.

Many Coriolis-type mass flowmeters induce a Coriolis force by oscillating the pipe sinusoidally about a pivot axis orthogonal to the length of the pipe. In such a mass flowmeter, Coriolis forces are exhibited in the radial movement of mass in a rotating conduit. Material flowing through the pipe becomes a radially travelling mass which, therefore, experiences an acceleration. The Coriolis reaction force experienced by the travelling fluid mass is transferred to the pipe itself and is manifested as a deflection or offset of the pipe in the direction of the Coriolis force vector in the plane of rotation.

A major difficulty in these oscillatory systems is that the Coriolis force, and therefore the resulting deflection, is relatively small compared not only to the drive force but even to extraneous vibrations. On the other hand, an oscillatory system can employ the inherent bending resiliency of the pipe itself as a hinge or pivot point for oscillation to obviate the need for separate rotary or flexible joints, which improves mechanical reliability and durability. Moreover, an oscillatory system offers the possibility of using the resonant frequency of vibration of the conduit itself to reduce the drive energy needed.

Energy is supplied to the conduits by a driving mechanism that oscillates the conduits by applying a periodic force. A typical type of driving mechanism is exemplified by an electromechanical driver, which exhibits motion proportional to an applied voltage. In an oscillating flowmeter the applied voltage is periodic, and is generally sinusoidal. The period of the input voltage (and, hence, the driving force) and the motion of the conduit is chosen to match one of resonant modes of vibration of the conduit. As mentioned above, this reduces the energy needed to sustain oscillation.

The Coriolis force resulting from oscillation of the conduit and mass flow is measured indirectly by sensors disposed on the flowmeter conduit. Like the driving force, the Coriolis force is periodic, having the same frequency as the driving force. The motion arising from the Coriolis force is, however, mathematically orthogonal to the drive motion. This relationship prohibits the drive motion from coupling with the Coriolis motion in an ideal flowmeter. In certain flowmeter designs, however, the Coriolis motion can couple with a second mode of vibration of the conduit, different from the drive mode. The amount of coupling between the Coriolis motion and the second mode of vibration is generally referred to as the amplification factor, which has a magnitude that depends on the ratio of Coriolis mode frequency and the resonant frequency of the second mode of vibration. The amplification factor should be a constant for a given system and must be known for the liquid flowing in the flowmeter.

SUMMARY OF THE INVENTION

The general purpose of the invention is to improve the performance of a Coriolis-type mass flowmeter. A more specific goal is to improve measurement accuracy for a wide variety of fluids.

These and other objects of the invention are achieved by various combinations of features disclosed herein. The claims appended hereto should be consulted for the scope of the invention.

According to the invention, a density insensitive Coriolis-type mass flowmeter for measuring mass flow of fluid is achieved in a continuous loop of fluid-transporting conduit having first and second resonant modes of oscillation by attaching a specific dummy mass to the conduit sized and positioned such that the ratio of resonant frequencies of the first and second resonant modes remains substantially constant for different densities of fluid flowing through the conduit.

In one embodiment, the conduit is driven about an axis midway between the ends of a preferably straight section. The drive apparatus can be a pair of drivers at the ends of the straight section which apply force at points that are equidistant from the oscillation axis, i.e., the midpoint of the section. A sensing apparatus measures the oscillatory motion of the conduit. The dummy mass is attached to the midpoint of the conduit. In this arrangement, given this mode of driven oscillation, the dummy mass affects the Coriolis motion but does not substantially affect the drive motion. In a preferred embodiment, the dummy mass is a metal slug mounted on a bracket.

In another embodiment, the flowmeter includes a second continuous loop of conduit parallel to the first conduit, the second loop having resonant modes of vibration substantially the same as those of the first continuous loop of conduit. A second dummy mass is attached to the second conduit and has a mass and position on the second conduit such that the ratio of resonant frequencies of the first and second resonant modes remains substantially constant for different densities of fluid flowing through the second conduit. In this embodiment, the drive apparatus oscillates the first and second conduits and the sensing apparatus is adapted to sense the relative motion of the first and second continuous loops of conduit. The drivers ar disposed between the two conduits. In the preferred embodiment, the conduit loops have corresponding straight sections with parallel oscillation axes midway between the ends of each section corresponding to the first resonant mode, and the dummy masses are affixed to the respective sections on the corresponding oscillation axes.

DESCRIPTION OF THE PREFERRED EMBODIMENTS

We first describe the figures.

MECHANICAL DESIGN

A specific tubular configuration is described herein in a perpendicular orientation, with respect to the direction of the process flow, i.e., the direction of flow in a straight section of pipeline in which the meter is to be inserted. The invention is equally applicable to inline configurations. The implementations illustrated herein are designed for flowmeters for a variety of products including petroleum based fuels, for example. The flowmeter and dummy mass described herein are applicable, of course, to a wide variety of other specific designs for the same or different applications.

Figure 1:
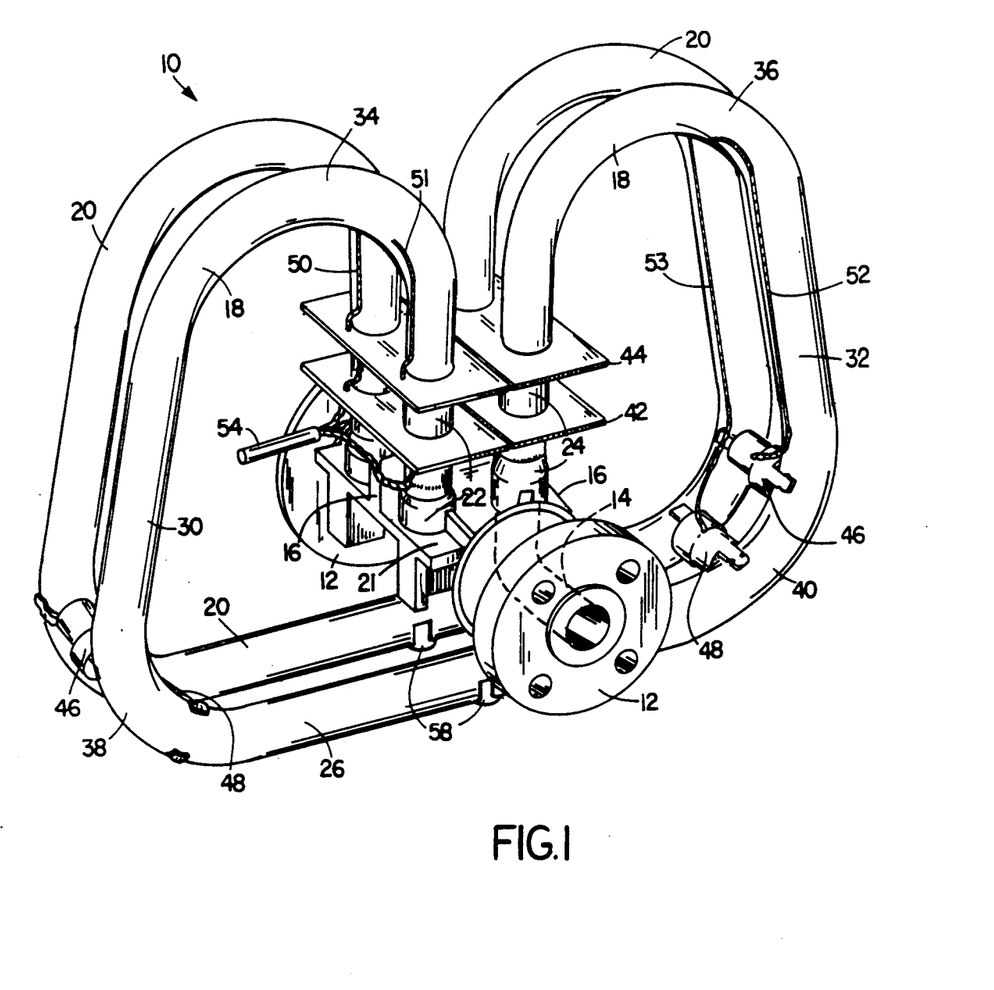
FIG. 1 perspective view of a Coriolis flowmeter of the present invention.

FIG. 1 illustrates a density insensitive double loop system with torsional loading of the tube ends where they are connected to a single rigid central manifold connected in line with the process flow. The same embodiment is shown in FIGS. 1 and 2.

The mass flowmeter 10 of FIG. 1 is designed to be inserted in a pipeline (not shown) which has had a small section removed or reserved to make room for the meter. The pipeline is equipped with opposing spaced flanges (not shown) which mate with mounting flanges 12 that are welded to or formed integrally with short sections of pipe 14 connected to a central manifold block 16, which supports the two parallel planar loops 18 and 20. The configuration and shape of loops 18 and 20 are essentially identical. Thus, the description of the shape of loop 18 holds true for loop 20 as well, except where noted. Manifold block 16 is preferably a casting in the general shape of a solid rectangular block with a flat generally horizontal upper surface or top 21 and integral pipe sections 14. Various portions of the manifold block may be removed, as shown, to reduce weight. The ends of loop 18 comprise straight, preferably vertical, parallel inlet and outlet sections or legs 22 and 24 securely affixed, e.g., by circular butt welding, to the top of the manifold surface 21 in close proximity to each other. The base of loop 18 is a long straight section 26 passing beneath the bottom face of manifold block 16. The long straight section 26 at the base of the loop 18 is connected to upright legs 22 and 24 by respective diagonal sections 30 and 32, respectively. The four junctions between the various straight segments of the loop 18 are rounded by large radii turns to afford as little resistance to flow as possible. In particular, upright legs 22 and 24 are connected to the respective diagonal segments 30 and 32 by means of apex turns 34 and 36. The ends of the long straight base section 26 are connected to the respective ends of the diagonal segments 30 and 32 by lower rounded turns 38 and 40.

The parallel inlet and outlet sections 22, 24 of both loops 18, 20 pass through correspondingly apertured isolation plates or node plates 42 and 44, which are parallel to upper manifold surface 21 and spaced from the manifold surface by a predetermined distance. Welded to the tube the node plates serve as stress isolation plates and define a common mechanical ground for each loop.

Figure 2:
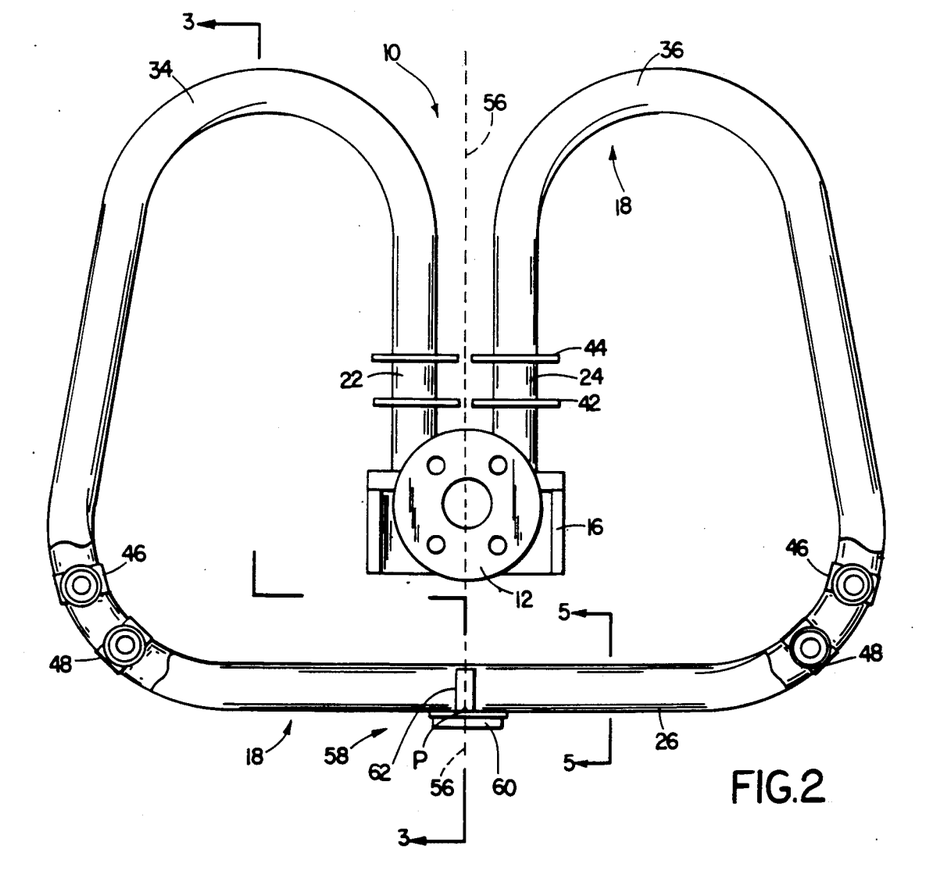
FIG. 2 schematic view of the flowmeter of FIG. 1.
Figure 3:
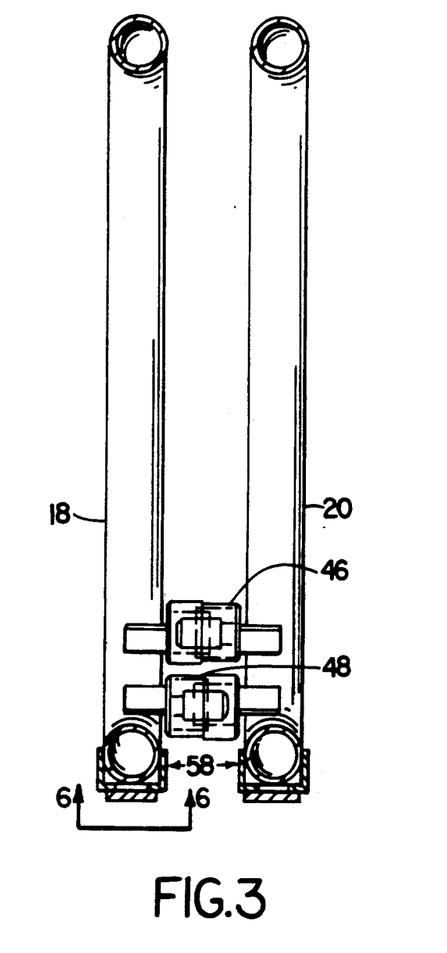
FIG. 3 is a schematic view of the flowmeter of FIG. 2 taken along lines 3—3 showing the relative locations a driver and a sensor.

Referring to FIGS. 1–3, electromechanical driver and detector assemblies are attached between loops 18 and 20 on each of the lower rounded turns 38 and 40. Each assembly consists of an electromagnetic driver 46 and sensor 48 disposed closely to each other, between the tubes 18 and 20. The electrical signals are transferred from driver and detection circuitry (not shown) to the drivers and sensors through wire leads 50, 51, 52 and 53 which run along the exterior of the tubes on the inside of the upper portion of the loops, through apertured isolation plates 42 and 44 to cable 54.

By energizing the driver pairs 46 on opposite ends of the straight sections of the tubes with current of equal magnitude but opposite sign (180 degrees out-of-phase), the straight sections 26 are caused to rotate about their respective co-planar perpendicular bisectors 56 which intersect the tubes at points p as shown for tube 18 in FIG. 2. The driven rotation of each straight section 26 is thus preferably in a horizontal plane about point p. The perpendicular bisectors for the straight sections of both loops preferably lie in a common plane of symmetry for both loops.

Repeatedly reversing (e.g., controlling sinusoidally) the energizing current of the drivers causes each straight section 26 to execute an oscillatory motion in the horizontal plane about point p, the axis of symmetry of the corresponding loop. The motion of each straight section 26 sweeps out a bow tie shape. The entire lateral excursion of the loop at the lower rounded turns 38 and 40 is small, on the order of ⅛ of an inch for a two foot long straight section 26 for a one inch pipe. This displacement is coupled to the upright parallel legs 22 and 24 as torsional deflections about the axes of the legs 22 and 24 beginning approximately at the node plate 44. Although antisymmetrical, the same type of oscillatory motion is induced in both straight sections 26.

Figure 4A:
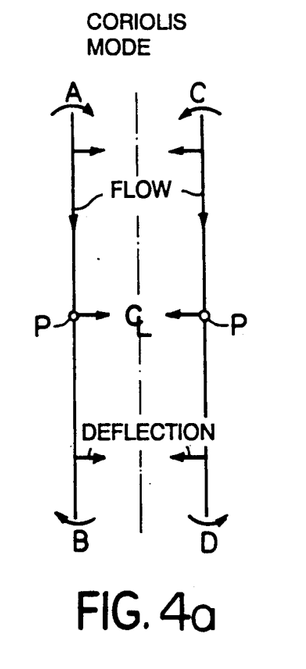
FIGS. 4a, 4b, and 4c are schematic representations of three mode motion of the flowmeter of FIGS. 1 and 2.
Figure 4B:
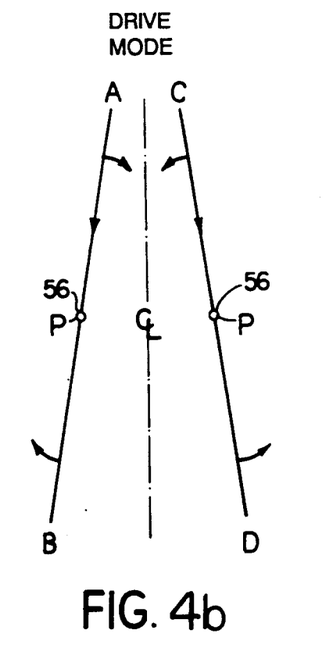
Figure 4C:
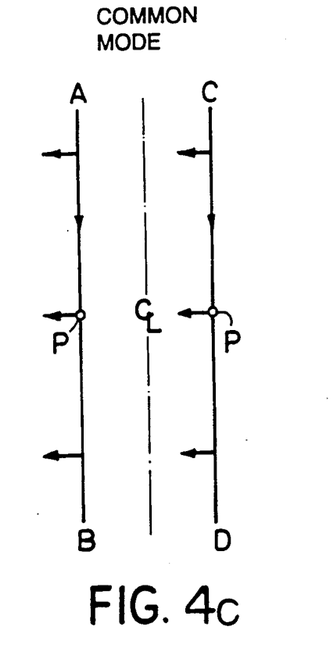

The motion of the straight sections 26 of loops 18 and 20 is shown in three modes in views 4a, 4b, and 4c in FIG. 4. Drive mode 4b is oscillatory about point p with the two loops rotating synchronously but in the opposite sense, i.e., while loop 18 rotates clockwise, loop 20 is undergoing counterclockwise rotation. That is, the loops are driven antisymmetrically 180° out of phase about point p. Consequently, respective ends such as A and C as shown in FIG. 4 periodically come together and go apart. This type of drive motion induces Coriolis effects in opposite directions as shown in view 4a. The Coriolis mode motion thus tends to pivot the whole planes of the loops 18 and 20 about an axis perpendicular to the respective drive axis 56. The Coriolis effect is greatest when the two straight sections 26 are parallel as shown in view 4a because the sinusoidally varying angular velocity (due to the drive mode) is then at its maximum. Because the Coriolis mode motion of each loop is in the opposite direction, the straight sections 26 move slightly toward (or away) from each other as shown in view 4a. A common mode motion, undesirable in this instrument, would be one which deflected the loops in the same direction as shown in view 4c. This type of motion might be produced by an axial wave in the pipeline itself in the embodiment of FIG. 1 because the loops are oriented perpendicular to the pipeline.

The sensors 48 detect the oscillatory motion of the straight sections of the tubes and output a signal that is representative of oscillatory drive force modulated with the coriolis reaction force exhibited by the fluid undergoing acceleration. Because of the close proximity of driver 46 and sensor 48, special precautions must be taken to prevent magnetic interlock from occurring. That is, the magnetic field from driver 46 may induce a voltage within the sensor 48 and give a spurious signal. It is preferred that a shielded driver and sensor be used to prevent magnetic interlock from occurring, as described in the above-referenced, co-pending Hussain application.

The frequency of the drive mode in the foregoing embodiment is chosen to correspond to a resonant mode of vibration of each conduit about its drive axis 56 to reduce the energy needed to sustain the vibration. The drivers 46 oscillate the straight sections ideally at or near their natural resonant frequency of vibration about drive axes 56. This resonant frequency is determined by design parameters, such as the size and material of the tubes, the geometry of the loops and the mass and location of the drivers and sensors, as well as the density of the fluid flowing through the tube. When the density of the fluid changes, for instance, due to the inclusion of gas bubbles in the fluid, or due to a change in the composition of the fluid itself the resonant frequency of the drive mode changes accordingly.

A second resonant mode of vibration also exists, namely the natural vibrational frequency of the pivoting action about the Coriolis axis (generally lying in the original plane of the loop). The resonance of the Coriolis mode is also affected by a change in density of the fluid in the conduit. However, the degree to which the two modes (i.e., drive and Coriolis) are affected is not the same. The amount of coupling between the Coriolis force generated in response to the driven oscillation and the Coriolis resonant mode referred to as the amplification factor of the system, depends on the ratio of the driven and Coriolis mode resonant frequencies. Thus, the amplification factor and, therefore, the mass flowmeter output signal depend on the density of the fluid. To minimize this dependence on density and thereby reduce the effect of mere changes in density on the output signal so as to keep the signal representative of mass flow rate, a dummy mass 58 is strategically sized and located on each loop.

Figure 5:
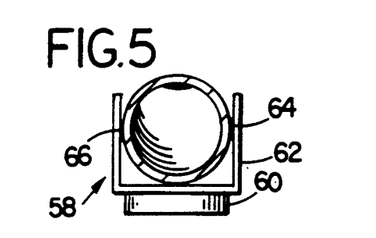
FIG. 5 is a schematic view of the dummy mass of FIG. 3 taken along 5—5.
Figure 6:
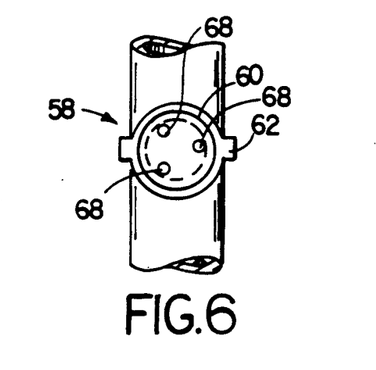
FIG. 6 is a schematic view of the dummy mass of FIGS. 3 and 5.

The position of the dummy mass of the present invention is shown schematically in FIGS. 2 and 3. The dummy mass 58 of the invention can be simply a discrete piece of material attached to the conduit. In one embodiment, the dummy mass 58 preferably comprises a metal slug 60 attached to the conduit by a bracket 62 in the form of a two-legged ring, as shown in FIGS. 5 and 6. The legs of the bracket 62 are spot welded to the conduit at points 64 and 66. The dummy mass 58 maintains the ratio of frequencies between the first and second modes of vibration constant. FIG. 6 is a bottom view of the dummy mass showing three holes 68 from which material was removed (e.g. by drilling) to adjust the mass precisely.

FIG. 4 shows a Coriolis-type mass flowmeter adapted to undergo an antisymmetrical drive oscillation about an axis 56, as shown in view 4b. The resulting Coriolis motion is in a symmetrical motion, shown in view 4a. The dummy mass is located on the conduit at the point where the oscillation drive axis 56 intersects the conduit. That is, the position of the dummy mass is located at the node of the drive oscillation, on the axis of symmetry. In this position, the mass of the dummy mass does not appreciably affect the natural frequency of oscillation of the drive mode since it is at the center of rotation. On the other hand, the Coriolis mode, which does not have a node at this location, is affected by both the location and mass of the dummy mass. The dummy mass is a discrete method for introducing a single additional mass onto the conduit which serves to modify the moment of inertia of the Coriolis mode of vibration. The resulting effective point mass can be sized to give the Coriolis mode of vibration roughly the same density dependence as the first mode of vibration, and therefore the ratio of the two modes, on which the amplification factor depends, remains constant.

With the above design considerations in mind, the system was modelled using finite element analysis, with a given tube configuration, and location of drivers and sensors. The optimum result was determined by substituting different masses for the dummy mass during successive runs of the program to find the one that minimized the variability in the ratio of resonant frequencies.

An actual flowmeter was constructed using the foregoing methodology. The shape was as illustrated in FIGS. 1, 2 and 3. The tubes were approximately one inch in diameter (actual OD 1.050" and ID 0.920") and were made of stainless steel. The drivers imposed a load of 27.3 grams for each tube, and the sensors imposed a load of 17 grams for each tube. For this flowmeter, a dummy mass of 23 grams (about 60% of the combined mass of the sensors and drivers) was attached to each tube and achieved a constant drive/Coriolis resonant frequency ratio of 1.5. For water, for example, the drive and Coriolis frequencies were 80 and 53 Hertz respectively. The mass of the dummy mass will depend on the individual flowmeter.

Removal of the dummy mass causes the density-insensitive mass flowmeter to revert to a density-sensitive mass flowmeter. Conversely, a density-sensitive flowmeter can be retrofitted by the mere addition of a dummy mass. Such a change is important for manufacturing procedures, since present facilities need not be changed, and currently used mass flowmeters may be upgraded by simply adding the appropriate dummy mass to the appropriate location.

An advantage of the dummy mass is the resulting flexibility that it offers to the designer. For instance, the dummy mass can be attached to the flowmeter after its construction and can be fine tuned for each flowmeter, to account for minor variations in flowmeter construction. However, because the dummy mass is typically 50-70% of the mass of the sensor and driver components on the tube, minor variations due to manufacture have little effect once the approximate size of the dummy mass for a given meter design is established.

Thus, in practice the predetermined dummy mass is simply applied without further trimming.

Using finite element analysis, the flow tube can be modelled mathematically to determine how different placements and masses affect the resonant frequencies. First, the geometrical and material parameters of the tube are chosen and drivers and sensors of specified weight are located on the tubes in the model. The mass and/or position of the drivers and sensors are adjusted to achieve a drive resonant frequency of 80 Hertz. Next, a dummy mass is proposed for the midpoint and is adjusted until a constant value of 1.5 is achieved for the ratio of the drive and Coriolis mode resonant frequencies irrespective of fluid density.

The modelled system is then built using real components of the same mass as those in the model developed in the finite element analysis, including the dummy mass. The result is two identical tubes with drivers and sensors and dummy masses with the predicted resonant frequencies and density independence.

After assembly, the tubes are balanced by monitoring the current necessary to drive the tubes at their resonances as different test masses are added to one of the tubes. A small clay mass is stuck on each end of one of the tubes at the location of the drivers, for example. If the drive current goes up, the correction was in the wrong direction and the clay pieces are switched to the other tube. The clay masses are varied until the lowest drive current is achieved. Typically, compared to the dummy mass for density small, e.g. on the order of one or two grams compared to a dummy mass of 23 grams such that the balance masses do not disturb the density independence. The same operation is conducted to balance the tubes in the Coriolis mode of vibration by switching the polarity of one of the drivers so that they are in phase and placing a clay mass on the midpoint of one of the tubes. This is done after the larger dummy mass has been affixed.

Once the size of the balance masses has been determined from the foregoing trial and error procedure, metal attachments, for example, screws, of the same mass as the clay masses that reduced the drive current the most are added to the drivers and to the dummy mass. Only one pair of driver halves will be affected and only one dummy mass will be affected for a given instrument, although the extra balance masses for the drivers could be on one tube and the Coriolis mode balance mass on the midpoint could conceivably be on the other tube. After gaining experience with a number of instruments manufactured the same way, a technician can readily conduct the final balancing procedure with only a few different sizes of clay pieces and corresponding permanent metal attachments available.

By following the general principle of locating an effective point mass other than a sensor or driver on the axis of the driver mode of oscillation, the density dependence of the natural frequency of vibration of the Coriolis mode can be profiled to correspond proportionately with the driver mode resonance.

What is claimed is:

1. A density insensitive Coriolis-type mass flowmeter for measuring mass flow of fluid comprising:
   a continuous loop of conduit for transporting said fluid, said loop having first and second resonant modes of oscillation;
   a drive apparatus adapted to drive a section of said conduit;
   a sensing apparatus adapted to measure the oscillatory motion of said conduit; and
   at least one dummy mass in addition to and spaced from said drive apparatus and said sensing apparatus, said dummy mass disposed on said conduit, and having a mass and position on said conduit such that the ratio of resonant frequencies of said first and second resonant modes remains substantially constant for different densities of fluid flowing through said conduit.

2. The flowmeter of claim 1 wherein said drive motion of said section of said conduit corresponds to said first resonant mode of vibration and said Coriolis motion corresponds to said second resonant mode of vibration.

3. The flowmeter of claim 2 wherein said first resonant mode of vibration corresponds to oscillation about an axis midway between the ends of said section.

4. The flowmeter of claim 3 wherein said section is substantially straight.

5. The flowmeter of claim 3 wherein said drive apparatus comprises a pair of drivers at respective ends of said section.

6. The flowmeter of claim 5 wherein said drivers apply force on said section at points equidistant from said oscillation axis.

7. The flowmeter of claim 1 wherein said additional disposition of said dummy mass affects said Coriolis motion.

8. The flowmeter of claim 7 wherein said additional disposition of said dummy mass affects the drive motion substantially less than said additional disposition of said dummy mass affects said Coriolis motion.

9. The flowmeter of claim 8 wherein said dummy mass is disposed on said section at an oscillation axis midway between the ends of said section.

10. The flowmeter of claim 1 wherein said dummy mass comprises a solid piece of metal.

11. The flowmeter of claim 10 wherein said solid piece of metal is mounted on a bracket.

12. The flowmeter of claim 1 further comprising a second continuous loop of conduit substantially parallel to said continuous loop of conduit, said second continuous loop of conduit having first and second resonant mode of vibration substantially the same as the first and second resonant modes of vibration of said continuous loop of conduit.

13. The flowmeter of claim 12 further comprising a second dummy mass, said second dummy mass having a mass and position on said second conduit such that the ratio of resonant frequencies of said first and second resonant modes remains substantially constant for different densities of fluid flowing through said second conduit.

14. The flowmeter of claim 13 wherein said drive apparatus is adapted to drive said first and said second continuous loops of conduit and said sensing apparatus is adapted to sense the motion of said first and said second continuous loops of conduit.

15. The flowmeter of claim 14 wherein said drive apparatus comprises a pair of drivers at respective ends of said sections.

16. The flowmeter of claim 15 wherein said pair of drivers are disposed between and are adapted to drive said first and said second continuous loops of conduit.

17. The flowmeter of claim 14 wherein said sensing apparatus comprises a pair of sensors.

18. The flowmeter of claim 17 wherein said pair of sensors are disposed between and are adapted to sense the motion of said first and said second continuous loops of conduit.

19. The flowmeter of claim 14 wherein said conduit loops have corresponding sections with parallel oscillation axes midway between the ends of each section corresponding to the first resonant mode, said dummy masses being affixed to the respective sections on the corresponding oscillation axes.

20. The flowmeter of claim 1 wherein said dummy mass comprises between about 50% to about 70% of the combined mass of said drive apparatus and said sensing apparatus disposed on said conduit.

21. The flowmeter of claim 20 wherein said dummy mass comprises about 60% of the combined mass of said drive apparatus and said sensing apparatus disposed on said conduit.

22. A density insensitive Coriolis-type mass flowmeter for measuring mass flow of fluid comprising:
 a solid support;
 a loop of conduit having an inlet and an outlet connected to said support and having a substantially straight section;
 a pair of drivers disposed at the ends of the straight section of said conduit, said drivers oscillating said straight section in a first resonant mode;
 a sensor adapted to measure the motion of said straight section; and
 at least one dummy mass in addition to and spaced from said pair of drivers and said sensor, said dummy mass disposed on said conduit, and having a mass and position on said conduit such that the ratio of resonant frequencies of said first resonant mode and a second resonant mode remains substantially constant for different densities of fluid flowing through said conduit.

23. The flowmeter of claim 22, wherein said loop has an axis of symmetry approximately bisecting said straight section, said drivers oscillating said straight section about said axis of symmetry, said dummy mass being effectively centered on said axis of symmetry.

24. The flowmeter of claim 22, wherein said conduit loop encircles said support.

25. The flowmeter of claim 22 wherein said dummy mass comprises between about 50% to about 70% of the combined mass of said pair of drivers and said sensors disposed on said conduit.

26. The flowmeter of claim 25 wherein said dummy mass comprises about 60% of the combined mass of said pair of drivers and said sensor disposed on said conduit.

* * * * *

UNITED STATES PATENT AND TRADEMARK OFFICE
CERTIFICATE OF CORRECTION

PATENT NO.   : 5,054,326

DATED        : October 8, 1991

INVENTOR(S)  : Wade M. Mattar

It is certified that error appears in the above-identified patent and that said Letters Patent are hereby corrected as shown below:

On the title page:
In References Cited, U.S. Patent Documents, "Hasengawa et al." should be --Hasegawa et al.--

Col. 7, line 30, insert --compensation, the clay masses added for balancing are very-- after "density".

Signed and Sealed this

Thirteenth Day of April, 1993

Attest:

STEPHEN G. KUNIN

*Attesting Officer*   Acting Commissioner of Patents and Trademarks